Jan. 3, 1939.    J. B. MORGAN    2,142,203
GRANULATING APPARATUS
Filed July 1, 1935    5 Sheets-Sheet 1

INVENTOR
Joseph B. Morgan
BY
Sager + Malcolm
ATTORNEYS

Jan. 3, 1939.  J. B. MORGAN  2,142,203
GRANULATING APPARATUS
Filed July 1, 1935  5 Sheets—Sheet 2

INVENTOR
Joseph B. Morgan
BY
Sager + Malcolm
ATTORNEYS

Jan. 3, 1939.                J. B. MORGAN                2,142,203
                        GRANULATING APPARATUS
                         Filed July 1, 1935              5 Sheets-Sheet 3
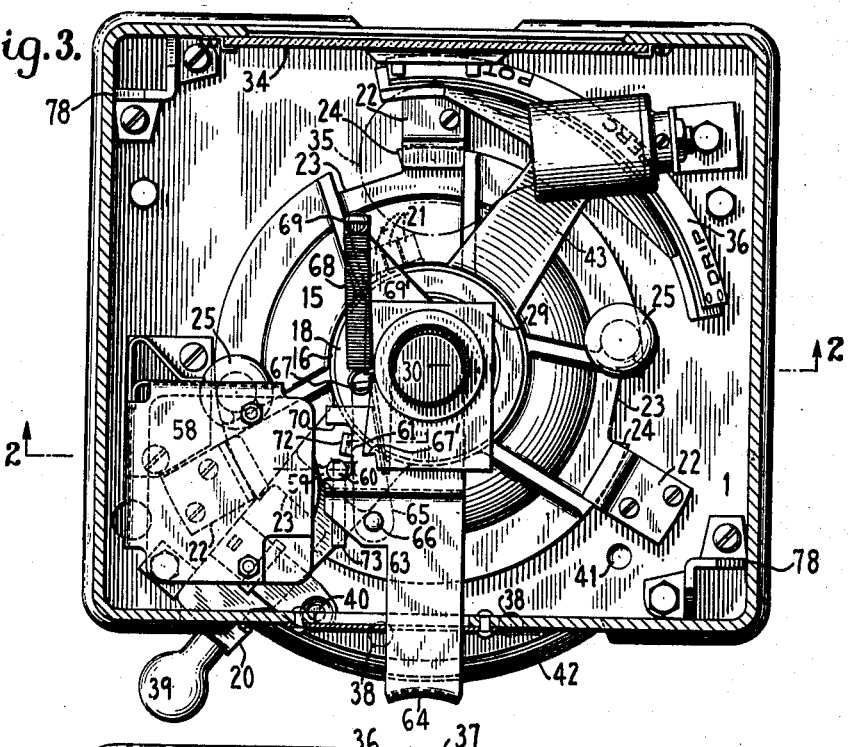
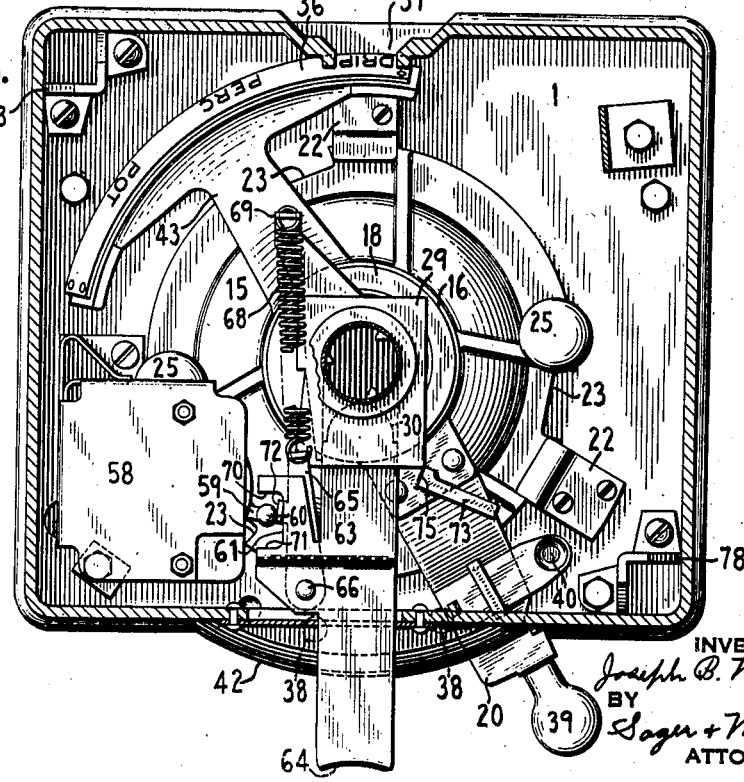
INVENTOR
Joseph B. Morgan
BY
Sager + Malcolm
ATTORNEYS Jan. 3, 1939.  J. B. MORGAN  2,142,203
GRANULATING APPARATUS
Filed July 1, 1935  5 Sheets-Sheet 4

INVENTOR
Joseph B Morgan
BY
Sager + Malcolm
ATTORNEYS

Jan. 3, 1939. J. B. MORGAN 2,142,203
GRANULATING APPARATUS
Filed July 1, 1935 5 Sheets-Sheet 5

INVENTOR
Joseph B. Morgan
BY
Sager & Malcolm
ATTORNEYS

Patented Jan. 3, 1939

2,142,203

UNITED STATES PATENT OFFICE 2,142,203

GRANULATING APPARATUS

Joseph B. Morgan, Flushing, N. Y., assignor to Jabez Burns & Sons, Inc., New York, N. Y., a corporation of New York Application July 1, 1935, Serial No. 29,193

1 Claim. (Cl. 83—18)

This invention relates to an improved method and apparatus for granulating and treating roasted coffee and prepare it as a suitable product for producing a satisfactory beverage. The invention is an improvement upon the pending applications of Joseph L. Kopf and John C. Kopf Ser No. 713,794, filed March 3, 1934, now Patent No. 2,019,013, John C. Kopf Ser. No. 714,929, filed March 10, 1934, now Patent No. 2,059,249 and John C. Kopf Ser. No. 733,219, filed June 30, 1934.

One object of the present invention is to provide a machine which may be conveniently, rapidly, and accurately set for a desired fineness of granulation and which will consistently produce and reproduce such granulations. Another object is to provide a machine wherein the coffee granules are brought into contact with the chaff particles and the coffee granules reduce these particles and coat them with oil so as to cause them to be practically imperceptible in the finished product and so produce a product which will be of uniform character and color throughout. Another object is to provide a machine which will present an attractive appearance and be durable and dependable under long continued use. Another object is to provide a machine wherein small batches of roasted coffee may be granulated and prepared and which will cause the machine to be completely and rapidly cleaned out at the end of each operation or action upon each batch. Another object is to provide an apparatus which tends to insure the purchaser obtaining the particular grind requested by the purchaser. Another object is to provide a visible indicator showing the grind for which the machine is set and for illuminating this indicator at the moment the mill begins to operate so that the purchaser's attention is immediately attracted thereto. Another object is to provide an improved method and form of machine for treating the coffee granules and the chaff particles in a simple and efficient manner. Other objects and advantages of this invention will be understood from the following description and accompanying drawings illustrating a preferred embodiment of the invention.

Fig. 3 is an enlarged horizontal section taken on the line 3—3 of Fig. 1;

Fig. 4 is an enlarged horizontal section taken on the line 4—4 of Fig. 1;

Figure 1:
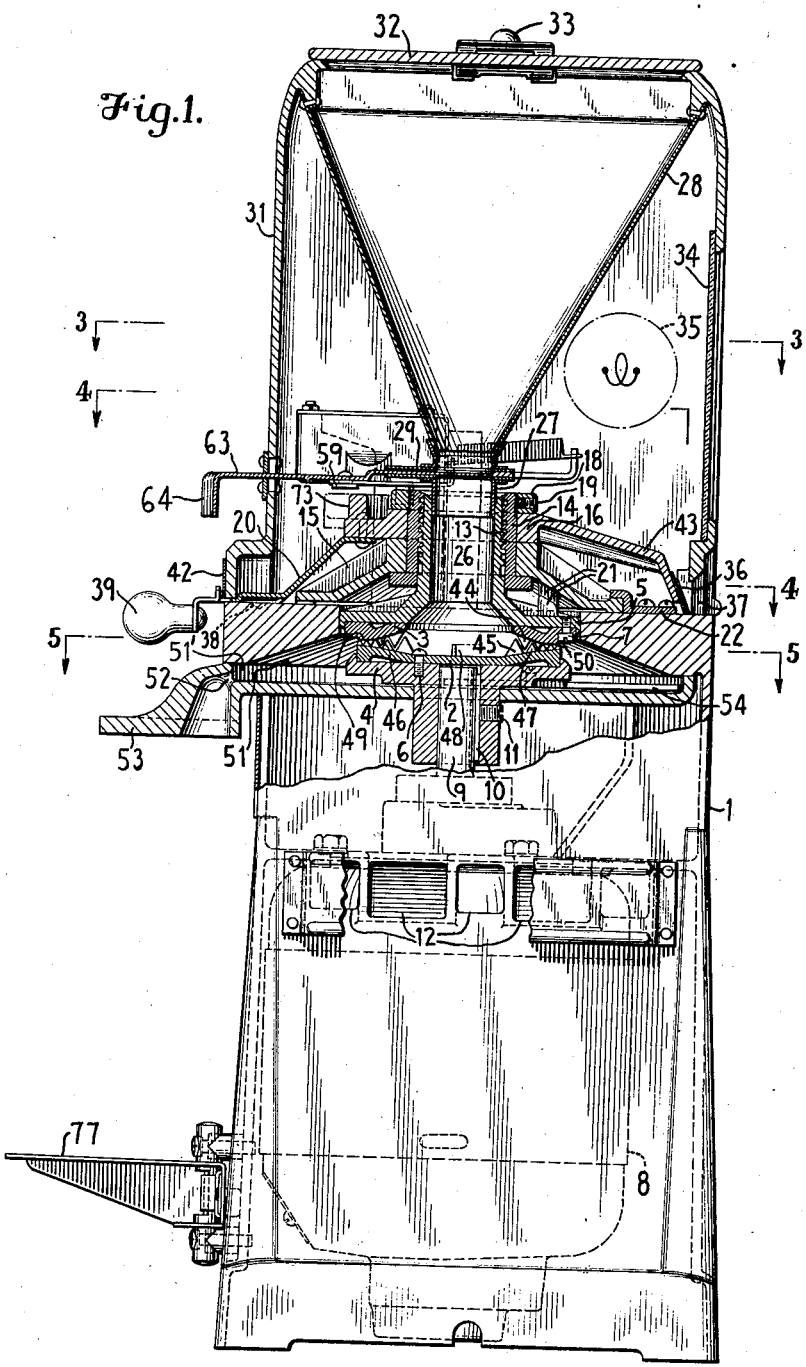
Fig. 1 is a side elevation of the machine, partly in section.

The machine has a casing or frame 1 containing cooperating granulating elements 2 and 3 which in this instance are in the form of plates mounted horizontally within the frame 1. These plates are secured to carriers 4 and 5 respectively, by screws 6 and 7, as shown in Figs. 1 and 5.

Figure 2:
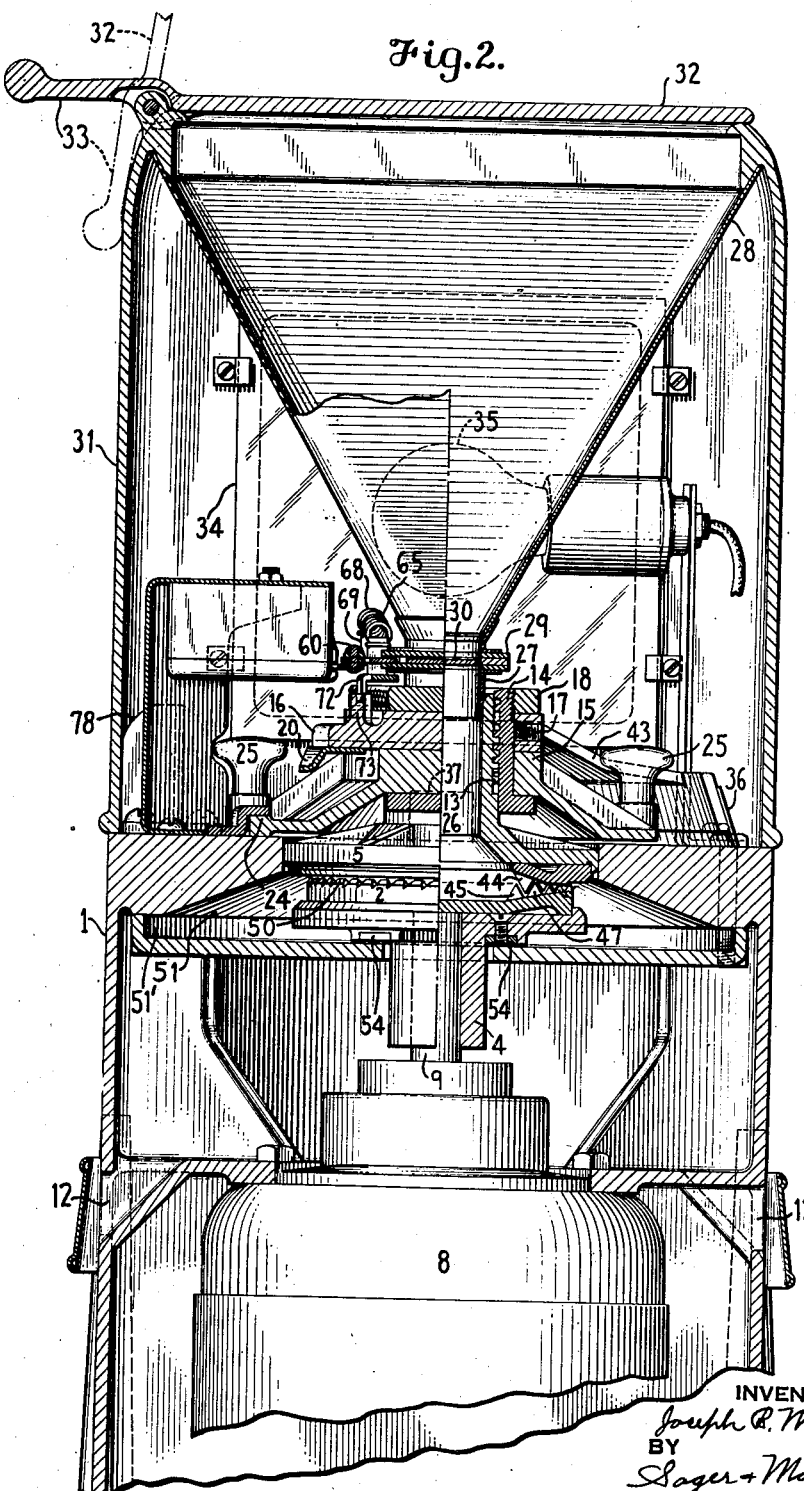
Fig. 2 is an enlarged vertical section taken on the line 2—2 of Fig. 3.
Figure 5:
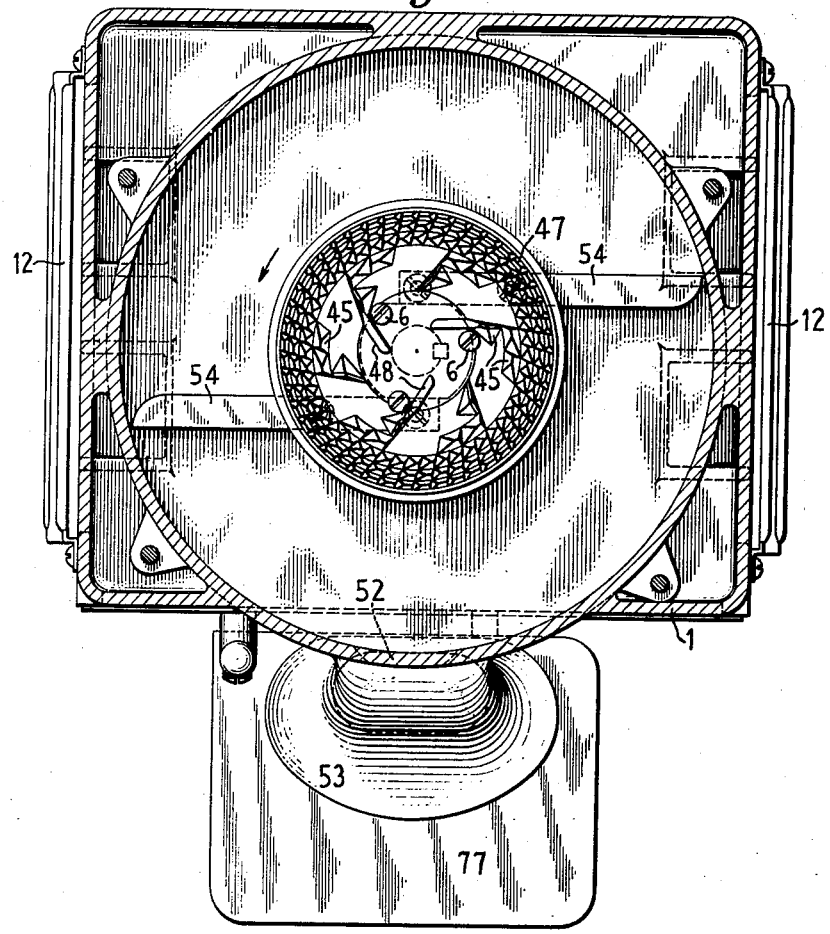
Fig. 5 is an enlarged horizontal section taken on the line 5—5 of Fig. 1.

The granulating plate 2 is rotated by a motor having its shaft 9 secured to plate carrier 4 by the key 10 and set-screw 11, rotation being in the direction of the arrow in Fig. 5. The motor may be ventilated by providing suitable openings 12 leading into the inside of frame 1 as shown in Figs. 1 and 2. The granulating plate 3 is stationary but is adjustable toward and away from the plate 2 to vary the fineness of the grind and to compensate for wear of the plates. The hollow shank of the plate carrier 5 is externally threaded at 13 to sleeve 14 which is rotatably mounted in a support 15 on top of the frame 1. The sleeve 14 carries an upper collar 16 which is secured thereto by set-screw 17 and a nut 18 which is threaded on the top of the sleeve 14 and secured in place by a set-screw 19. The collar 16 carries a control member such as a lever 20 extending beyond the frame 1. Movement of this lever to the right or left, as viewed in Figs. 3 and 4 rotates the sleeve 14 and causes the plate 3 to move toward or away from plate 2, cooperating lugs 21 on the plate carrier 5 and support 15 preventing the plate carrier from rotating. The adjustment of this mechanism to provide a plurality of different grinds and to compensate for plate wear, will hereinafter be more fully described.

The support 15 with the entire plate adjusting mechanism is secured to the frame 1 by suitable means, which in this form comprises a bayonet connection consisting of lugs 22 secured to the frame 1, cooperating with slots 23 and pads 24 on the support 15. By grasping the handles 25 secured to the support 15 and rotating the same in a clockwise direction, the support 15 together with all the plate adjusting mechanism may be removed from the machine.

Coffee, in the bean, is fed to the granulating plates 2 and 3 through the hollow shank 26 of the carrier 5 from the nozzle 27 of the hopper 28. A gate 29 having a slide 30 is interposed between the hopper 28 and its nozzle 27. The hopper 28 is secured inside a top casing 31 at its upper rim in any suitable manner, or it may be made integral therewith. A top cover or lid 32 may be provided for covering the top of the hopper and may be hinged and adapted to be raised or removed by means of a handle such as 33.

Figure 8:
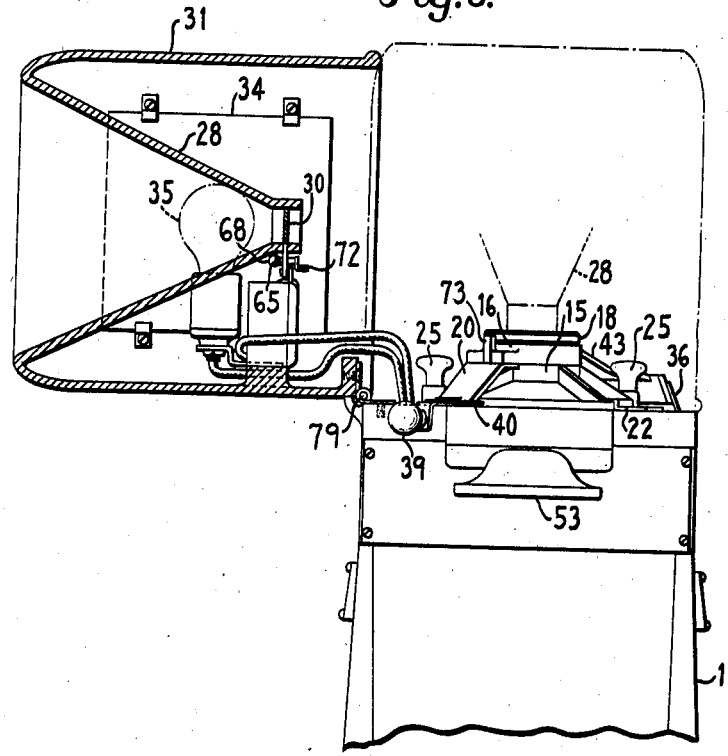

As illustrated in Figs. 1, 2 and 8, the hopper casing 31 is provided with a transparent or semi-transparent display sign 34 on one side, bearing any suitable legend which becomes prominently readable upon the lighting of the bulb 35 located in the rear of the transparency 34. The bulb 35 is also utilized to illuminate a grind indicator band 36 to make the same clearly visible through an aperture 37 in the casing 31. The band 36 is inclined inwardly so that the light 35 illuminates the same and reflects the light outwardly through the aperture 37 in such a way as to strikingly attract the attention of the customer to read the particular indication showing the grind for which the machine is set. The size of the granules of finished coffee produced by the machine depends upon the spacing of the granulating plates 2 and 3. As it is important that the size and proportion of the various granules be fixed for any particular method of brewing coffee as a beverage, it is also essential that when once established, the machine shall be capable of producing and reproducing such definite grinds. For this purpose depressions 38 are provided in the upper face of the frame 1, such depressions being of predetermined circumferential spacing. Carried by the lever 20 is a yieldable finger member 39 having a downwardly projecting teat 40 to cooperate with the depressions 38. When adjusting the plates in the first instance, or at any time thereafter to compensate for wear, the set-screw 17 is loosened and the collar 16 is rotated by lever 20 until the teat 40 of the finger member 39 drops into the zero depression 41 on the top of the frame 1, as shown in Fig. 3. Nut 18 is then rotated until plates 2 and 3 just click, lever 20 still being held in the position with the teat of its finger member in the zero depression 41. With the parts in this position, set-screw 17 is tightened to the sleeve 14. Thereafter, movement of the lever to the left, as viewed in Fig. 3, causes separation of the granulating plates. Suitable graduation on a band 42, on the operator's side of the machine, may be provided to indicate predetermined sizes of granulated coffee. On the opposite side of the machine, predetermined kinds of grinds are printed on the indicator band 36, as indicated in Fig. 3, which band moves in conjunction with the lever 20, the band being secured to a portion 43 extending from the collar 16.

Granulating elements 2 and 3 having been adjusted to produce the desired fineness of the product, coffee in the bean passes from the hopper 28 to the hollow shank 26 of the fixed plate carrier 5 into the bite of the breaker 44 and 45 where the beans are broken up into large pieces. The large pieces are then acted upon by the cracker teeth 46 and 47, the formation of a dead spot of coffee being prevented by flights 48 on the rotating granulating plate.

Breaker teeth 44 and 45 and cracker teeth 46 and 47 are provided with lands at their cutting faces and from then on are rapidly backed off to provide a maximum of space between successive series of such teeth. The form of one of the granulating plates is well shown in Fig. 5. The result of this backing off and providing of large spaces between successive series of teeth is that the large pieces of coffee which are produced by the breaker teeth together with the cracked coffee produced by the cracker teeth and the released chaff are co-mingled in the spaces before they can gain entrance into the inner series of finisher teeth 49 and 50.

After the coffee has passed through the finisher granulating teeth, it is discharged into an annular cone-shaped chamber 51 formed in the upper part of the main frame 1. The chamber has an outer narrow peripheral portion 51' which has a restricted discharge outlet 52 leading to a spout 53. From this spout the finished product is discharged into any desired container which is conveniently supported on the shelf 77.

Figure 6:
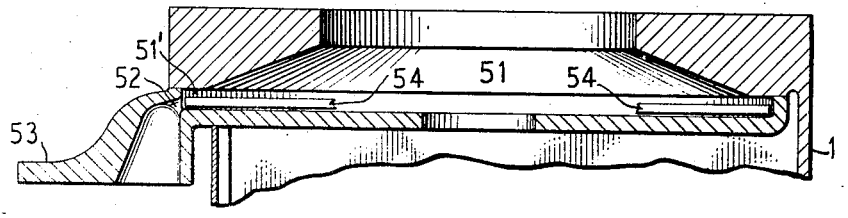
Fig. 6 is a fragmentary vertical section showing the treating chamber and restricted outlet.

Attached to the rotating carrier 4 are a plurality of fliers or arms 54. These are preferably straight and of rectangular cross-section and located a small distance above the lower surface of the chamber 51. They also extend outwardly into the reduced portion 51' of the chamber and quite near to the outer periphery of the chamber, as well shown in Fig. 6. As the granulated material is thrown outwardly from between the granulating plates, the particles strike the interior surfaces of the chamber 51 and are thrown about and come in contact with the intermingled chaff thereby reducing it to some extent. Also the rotating fliers or arms come in contact with the material which is thereby directed and urged outwardly into a space which becomes more and more confined owing to its converging character. During this action the coffee granules and chaff come more intimately into contact and the chaff is further reduced. The restricted discharge opening causes a bulk of the material to form in the chamber 51 and as the material is forced outwardly by the fliers it finally enters the narrow portion of the chamber and by the rubbing and abrading action of the fliers and coffee granules against the chaff by the fliers passing through the mass of material and moving a portion of the mass relatively to other portions of the mass at the periphery and the increased compactness and pressure of the material, the chaff is further reduced and coated with oil before it is able to pass through the restricted discharge opening. The mixing of the material and the reduction of the chaff and the coating of the same with oil causes the finished product to have a uniform color and to be homogeneous throughout. Furthermore, on account of the converging shape of the chamber and the narrow peripheral passage, the fliers or arms will cause all of the material to pass out through the discharge opening, giving a complete discharge of the particular batch placed in the hopper for treatment. Thus this particular improvement not only accomplishes complete reduction of the chaff so that it is practically imperceptible in the ultimate product but produces a homogeneous and uniform product with complete discharge of the particular batch treated, in an efficient and rapid manner.

The motor 8 is under control of a snap-switch such as of the toggle type and may be provided with an over-load protective device for preventing damage to the motor in case of any foreign material being lodged between the granulating plates which would cause an excess load on the motor. The switch is provided with the usual toggle arm 59 shown in Figs. 3 and 4 as extending out from the switch box 58, as shown in Figs. 3 and 4. On the arm 59 is mounted an upwardly extending projection or handle 60 which cooperates with a cam slot 61 formed in the slide 30 of the gate mechanism. In its normal position, the gate slide 30 closes the aperture of the gate 29. The slide 30 is provided with an extension 63 which carries a finger piece 64 at its outer extremity where it is accessible to the operator. Carried by the extension 63 is a pawl 65 pivotally mounted thereon at 66 and adapted to engage a notch 67 cut into the gate 29 to prevent the leading edge of the slide from becoming burred due to slamming.

A tension spring 68 urges the pawl 65 into engagement with the notch 67 both longitudinally and in a direction toward the gate 29. The pawl 65 is adapted to engage not only the notch 67 in the closed position of the gate but is also biased to engage a notch 67' in the gate 29 when in the open position. One end of the spring is anchored to the pawl and the other is anchored to an abutment 69 extending upwardly from an extension 69' from the gate 29. The switch within the casing 58 is opened and closed through cooperation of the handle 60 on the toggle arm 59 with the cam faces 70 and 71 formed on a side extension of the gate slide 30. The pawl 65 has formed thereon a downwardly projecting finger 72, as well shown in Fig. 7, which projects in the path of an abutment 73 formed on the collar 16. When the plates are in a non-grinding position and the operating lever 20 is in the extreme left-hand position, as shown in Fig. 3, the edge 74 of the finger 72 adjoins the face 75 of the abutment 73. This locks the gate closed because the slide 30 cannot then be pulled outwardly against the abutment 73. It also locks the starting switch in open position because until the gate slide 30 is released, the switch cannot be moved to closed position and is locked in the open position by the cam face 71 being against the knob 60 of the switch toggle arm.

Figure 7:
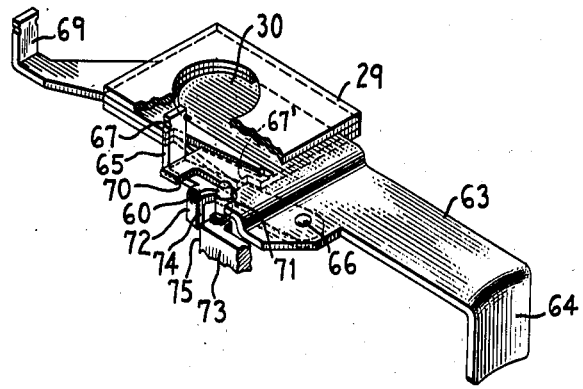
Fig. 7 is a perspective view partly in section of the feed gate of the machine and showing its cooperating locking mechanism and Fig. 8 is a front elevation of a modification on a reduced scale and partly in section and showing the top portion of the upper portion of the machine moved to its open position.

In operating the mill and assuming that the lever 20 is in the neutral or non-grinding position and the gate closed, as shown in Figs. 3 and 7, the coffee is dumped into the hopper 28 and the selector lever 20 is moved to the right and set in any desired grind position. The movement of the lever 20 to any one of the grind positions, releases the slide 30 by swinging the abutment 73 out of the path of the finger 72. The gate of the machine may then be opened by the operator pulling the finger piece 64 forwardly which permits the coffee to be fed to the granulating plates, the pawl 65 being automatically moved by spring 65 into notch 67' to hold the slide 30 in open position. The forward movement of the slide 30 causes the cam face 70 of the slide to move forward and engage the knob 60 of the switch and throw it to switch closing position. This closes the circuit of the motor and starts the rotation of the plate 2 and of the fliers 54. The closing of the switch also passes current through the lamp 35 which is connected in parallel with the motor across the supply circuit. The lamp is thus turned on at the time the motor starts the grinding operation and illuminates the indicator band 36 so that the portion thereof which is opposite the aperture 37 and which indicates the particular grind for which the machine is set, thereby attracts the attention of and informs the customer of the particular grind for which the machine is set. The customer is thus enabled to check this information with the particular grind requested.

The mill then operates to granulate the coffee which is fed to the teeth from the hopper and is then thrown outwardly into the converging chamber where the material is treated and discharged according to the method already described. After the batch of coffee treated has been entirely discharged, the lever 20 is moved back to the neutral or non-operative position. This causes the side face of the abutment 73 to contact with the depending finger 72 and thereby forces the pawl 65 to swing out of the notch 67'. This permits the spring 68 to move the slide 30 to close the gate of the machine, the pawl 65 being thrown in to engage the notch 67 for stopping the slide in its closed position. In this closing action the finger 72 moves along the side face of the abutment 73 and into a position behind the face 75 of this abutment which again locks the gate against manual operation. During the closing movement of the slide, the motor switch is automatically thrown to open position by the cam face 71 engaging the knob 60 which stops the motor and turns off the light 35.

Thus the motor cannot be started, or the granulating operation begin, until the selector lever has been moved from the neutral position to a selected granulating position; and then only when the gate slide is moved to open position. Also in order to stop the motor and close the gate, the selector lever must first be moved to the neutral position, which movement causes the automatic stopping of the motor and closing of the gate.

The upper body 31 rests upon the base portion 1 and is held in place by gravity only and may be entirely lifted therefrom manually. The angle corner pieces 78 serve to guide and keep the hopper body in proper position relatively to the base 1. In the modified form shown in Fig. 8, the hopper body is illustrated as being hinged at 79 to the main base 1.

Although a particular embodiment of this invention is described, various modifications may be made without departing from the scope thereof.

I claim:

A machine for granulating and treating coffee comprising cooperating grinding elements for granulating the coffee and freeing the chaff, a circular casing enclosing said grinding elements and extending outwardly beyond and below said elements to form an unobstructed conical chamber terminating in a narrow peripheral portion and provided with a flat bottom for receiving the granulated coffee and chaff from said elements, said chamber having a discharge opening at its periphery the circumferential extent of said opening being a small arc of the periphery to form a restricted discharge opening for causing a mass of the granulated coffee and chaff to accumulate in the chamber, and a rotatable element located near the bottom of said chamber and having a radially extending narrow advancing face at its outer end at the periphery of the chamber and extending to said discharge opening, said face being of such low height as to pass through said mass and engage only a portion of the mass for urging it outwardly toward and through said discharge opening for causing an abrading action against the chaff by relative movement of said portion of the mass against other portions of the mass to reduce the chaff and render it substantially invisible in the finished product.

JOSEPH B. MORGAN.